(12) United States Patent
Denawa et al.

(10) Patent No.: US 6,219,128 B1
(45) Date of Patent: Apr. 17, 2001

(54) AUTOMATIC PROCESSING APPARATUS AND IMAGE RECORDING DEVICE

(75) Inventors: Tatsuyuki Denawa, Kanagawa; Kimihiro Nakatsuka, Kyoto, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/659,083

(22) Filed: Sep. 11, 2000

(30) Foreign Application Priority Data

Sep. 13, 1999 (JP) .................................. 11-258613

(51) Int. Cl.[7] ........................... G03B 27/32; G03B 27/52; G03B 27/30; G03B 7/00; G02B 7/00
(52) U.S. Cl. .............................. 355/27; 355/30; 355/75; 355/100; 359/507; 359/513; 396/579
(58) Field of Search ................................. 355/27, 30, 75, 355/100; 359/507, 513; 396/579

(56) References Cited

U.S. PATENT DOCUMENTS

| | | | |
|---|---|---|---|
| 5,168,301 | 12/1992 | Akisada et al. | 355/27 |
| 5,557,362 * | 9/1996 | Ueda | 354/324 |
| 6,102,588 * | 8/2000 | Verlinden et al. | 396/626 |
| 6,149,320 * | 11/2000 | Ichikawa et al. | 396/564 |

FOREIGN PATENT DOCUMENTS 2602568   1/1997   (JP) .............................. G03B 27/14

* cited by examiner

Primary Examiner—Russell Adams
Assistant Examiner—Khaled Brown
(74) Attorney, Agent, or Firm—Sughrue, Mion, Zinn, Macpeak & Seas, PLLC

(57) ABSTRACT

A photosensitive material which has been exposed by an exposure device is fed into a processor, which is an automatic developing device, by a delivery section and processed. Within the exposure device, negative pressure is generated for holding the photosensitive material by suction. A gas outflow preventing device provided at the delivery section includes a chamber disposed in an upper vicinity of guides of a transport device. A nozzle that protrudes from this chamber is provided opposing an exposed photosensitive material insertion slot of the processor. The gas outflow preventing device blows air, which is fed into the chamber by operation of a blower fan, from an ejecting slit formed in the nozzle toward the photosensitive material insertion slot. This blowing of air, without interfering with output of the photosensitive material to the processor, prevents air in the processor flowing out through the photosensitive material insertion slot to the exposure device side.

18 Claims, 6 Drawing Sheets

F I G. 3
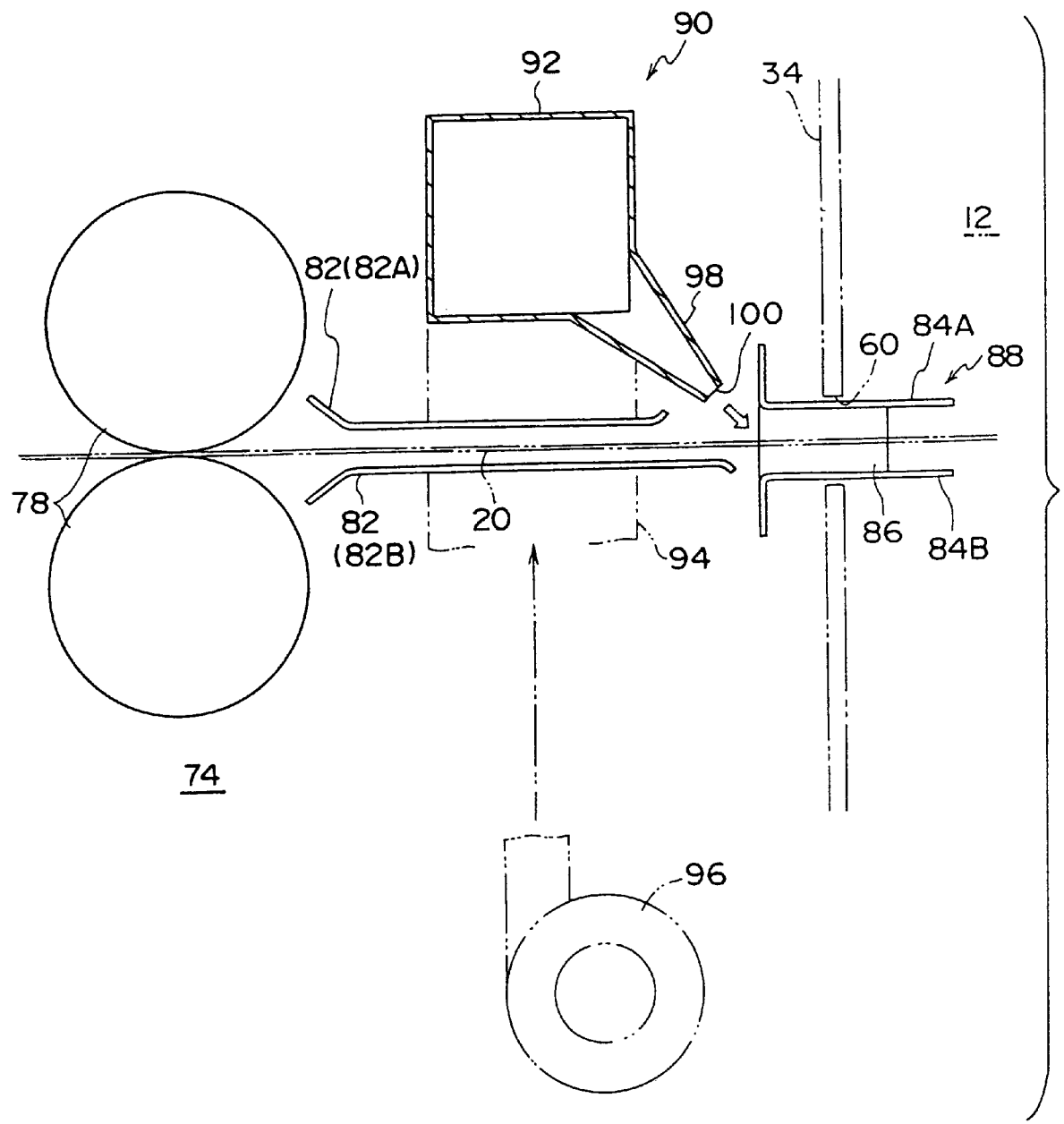

AUTOMATIC PROCESSING APPARATUS AND IMAGE RECORDING DEVICE

BACKGROUND OF THE INVENTION

1. Field of the Invention

The present invention relates to an automatic processing apparatus for processing, with processing solutions, a photosensitive material inserted through an insertion slot after imagewise exposure.

2. Description of the Related Art

In case that a printing plate for printing high-volume printed matter is produced, proofing to check that there are no mistakes in lettering in the printing plate is performed. Further, when color printing is performed, proofing that includes checking that there are no errors in colors is performed. Therefore, for example, when color printing is performed, a color proof image is formed on a photosensitive material.

In order to produce such a color proof, a color proof producing device is used. In the color proof producing device, an image exposure device, which exposes the photographic material, is used as an output device, and an automatic processing apparatus (hereinafter referred to as a "processor"), which develops and processes the photographic material exposed in the output device, is connected to the output device.

Generally, in the processor, a photosensitive material that has been inserted through the insertion slot is immersed in processing solutions, for example, a developing solution, a bleach-fixing solution, a rinsing solution (or a washing water) to perform processing with processing solutions. Then, a drying is performed. At this time, the processing solutions e. g. the developing solution, the bleach-fixing solution, etc. are temperature-controlled so as to optimally finish the photosensitive material.

In such a processor, the processing solutions are stored within the apparatus and are temperature-controlled. Therefore, as the air temperature increases, the humidity in the processor increases. Further, corrosive gases from constituents of the processing solutions are retained within the apparatus.

Therefore, if air in the processor enters the output device which is connected to the processor, the air may be condensed in the output device, and the condensed moisture and the corrosive gases may cause corrosion of internal components (parts) of the output device.

When making a printing plate for printing, a plate-making method wherein image data is transformed to digital signals and a printing plate is exposed to a light beam modulated on the basis of this image data is widely used. In this plate-making method, a color proof producing device, in which a processor is connected to an image exposure device to which the photosensitive material for proofing is exposed on the basis of image data, is used.

For example, in the image exposure device to which the photosensitive material is exposed on the basis of the image data, the photosensitive material is wound around a rotating drum, and the rotating drum is rotated at high speed while holding the photosensitive material by suction due to negative pressure. Thus, the photosensitive material is imagewise scan-exposed.

In the image exposure device which holds photosensitive material by suction with negative pressure, when the photosensitive material is fitted to the rotating drum and held, pressure in the device may become lower than pressure outside the device. In case that a processor is connected to such image exposure device, and that the photosensitive material is fed from the image exposure device into the insertion slot of the processor, when internal pressure of the image exposure device becomes low, air in the processor will be sucked into the image exposure device through the insertion slot, which will be condensed and make the components in the image exposure device to corrode.

Therefore, there are color proof producing devices provided with an opening and closing mechanism such as a shutter in the insertion slot of the processor. The insertion slot is opened when the photosensitive material is passed through. The insertion slot is closed when the photosensitive material is not passed through, to prevent air in the processor from flowing into the image exposure device.

Further, there are color proof producing devices provided with an exhaust fan in the processor. Air in the processor is exhausted by this exhaust fan. Thus, inflow of air from the processor through the insertion slot into the image exposure device is prevented.

However, in order to prevent air in the processor from flowing into the image exposure device by an exhaust fan when pressure in the image exposure device is lowered, it is necessary to use a high capacity exhaust fan and it is difficult to reliably prevent outflow of air from the insertion slot.

Further, even though the exhaust fan is provided to exhaust air from the processor, air in the processor flows through the insertion slot into the image exposure device, where the interior of the image exposure device has a negative pressure. That is, in a rapid processing, when discharge of photosensitive material on which an image has been printed and attachment of subsequent photosensitive material onto the rotating drum by suction are simultaneously performed, and the insertion slot of the processing section of the processor is opened under the reduced internal pressure of the image exposure device, air in the processor flows into the image exposure device.

Therefore, to prevent air from flowing through the insertion slot of the processing section of the processor into the image exposure device, it is necessary to extend processing intervals of the photosensitive materials, and as a result, processing efficiency is reduced.

SUMMARY OF THE INVENTION

The present invention is made in view of the above-described facts, and an object of the present invention is to provide a gas outflow preventing device, which constitutes a part of a photosensitive material processing apparatus, and which prevents internal air from flowing out through an insertion slot of the photosensitive material processing apparatus which processes photosensitive material with processing solutions without reducing processing efficiency of the photosensitive material.

In order to accomplish the above-described object, an automatic processing apparatus for processing an exposed photosensitive material with processing solution according to a first aspect of the present invention comprises (a) a housing having an insertion slot for the photosensitive material defined therein for receiving the exposed photosensitive material therethrough into the housing for processing the photosensitive material with processing solutions; (b) a conveyor system disposed in the housing, which receives the photosensitive material and conveys the material along a transport path, while the photosensitive material is processed with processing solutions; (c) a gas outflow preventing device for reducing gas outflow from the housing, the gas outflow preventing device including: (i) a nozzle having an opening disposed toward the travelling direction of the exposed photosensitive material and transversely directed toward the insertion slot (i. e. directed toward the transverse direction of the photosensitive material); and (ii) a blower connected to the nozzle, so that air is supplied from the blower to the nozzle.

In accordance with the first aspect of this invention, air supplied by the blower is blown out from the opening of the nozzle toward the insertion slot. Air is blown out from the opening of the nozzle onto the whole areas of the insertion slot.

Therefore, although the insertion slot is always opened so that the photosensitive material can be inserted, outflow of air in the processing apparatus through the insertion slot is reliably prevented by the air blown out from the opening of the nozzle toward the insertion slot.

In accordance with the first aspect of this invention, the output device is connected to the insertion slot of the processing section of the processor. When the exposed photosensitive material is fed out from the output device and fed into the insertion slot of the processor, the opening of the nozzle are disposed adjacent to the transport path of the photosensitive material and prevents air in the processor from flowing into the output device.

Thus, condensation on and corrosion of internal components of the output device due to high humid air can be prevented.

An image exposure device, which holds the photosensitive material by suction due to negative pressure and to which the photosensitive material is exposed, may be used as the output device which is connected to the automatic processing apparatus in the first aspect of the present invention.

An image recording device according to a second aspect of the present invention comprises: (a) an exposure section for exposing photosensitive material, including an electromagnetic radiation source operable for directing electromagnetic radiation toward the photosensitive material; (b) a substantially closed processing section having an insertion slot, through which exposed photosensitive material is inserted from the exposure section into the processing section, including at least one tank for containing processing solution for processing the photosensitive material; (c) a transporting section provided between the exposure section and the processing section, including at least one roller which rotates for receiving photosensitive material from the exposure section and feeding the material into the insertion slot of the processing section; and (d) a gas outflow preventing device including: (i) a nozzle having an air feeding slit and provided in the transporting section, extending along the insertion slot, and directed towards the insertion slot of the processing section; and (ii) a blower connected in air communication to the nozzle and supplying the nozzle with an air stream in its operation, which is directed by the air feeding slit of the nozzle toward the insertion slot of the processing section.

In the image exposure device which sucks the photosensitive material with negative pressure, pressure within the image exposure device is reduced by the negative pressure sucking and holding the photosensitive material onto a rotating drum. Thus, air tends to flow through the insertion slot of the processing section of the automatic processing apparatus into the image exposure device. However, the nozzle blows out air toward the insertion slot. Thus, even though the pressure within the image exposure device is lowered, outflow of air in the automatic processing apparatus through the insertion slot into the image exposure device can be reliably prevented.

Therefore, in the image exposure device, suction and holding of the photosensitive material which is subjected to imagewise exposure can be performed, while the photosensitive material for which image exposure has finished is discharged to the automatic processing apparatus. Thus, continuous exposures of the photosensitive materials can be performed efficiently.

Preferably, the photosensitive material used in an automatic processing apparatus which is the first aspect of the present invention includes opposite coating layers on a support, one of which is a photosensitive layer, and the nozzle is disposed nearer to the photosensitive layer than to the opposite layer.

In accordance with the first and second aspects of this invention, the nozzle is provided in a side of the photosensitive layer of the photosensitive material. Therefore, the air blown out from the opening of the nozzle can prevent the photosensitive layer side surface from being pressed against guides that are disposed in the vicinity of the insertion slot for the photosensitive materials of the processing section of the processing apparatus. Thus, damage to the photosensitive layer caused by scratching due to the pressure given by the guides can be prevented.

Preferably, an automatic processing apparatus of the present invention has the insertion slot including an entrance leading into the housing, the entrance being elongated, with the nozzle disposed for directing air into said entrance.

In accordance with the first aspect of this invention, the insertion slot of the processing section of the automatic processing apparatus is formed in a substantial rectangular cylindrical shape with a flange around the periphery of the insertion slot of the processing section of the processing apparatus. Therefore, air blown out from the nozzle fills the open portion of the insertion slot so as to block the open portion. Thus, air in the processing section of the processing apparatus can be reliably prevented from leaking out through the insertion slot.

In the first and second aspects of the present invention, it is preferred that the opening of the nozzle is disposed facing over the entire length of the insertion slot along the transverse direction of the photosensitive material. Thus, outflow of air in the apparatus from both longitudinal direction end portions of the insertion slot, which is formed in a slit shape, as well as outflow from a center portion thereof, can be prevented.

Further, in the first and second aspects of the present invention, the nozzle is connected to a chamber and an air flow is supplied from a blower device via the chamber. The chamber may be formed in a wedge shape such that the cross-section gradually narrows from one end portion of the transverse direction of the photosensitive material toward the other end portion thereof.

Further, the first and second aspects of the present invention may have a structure in which an air deflection device is provided in the chamber, and at least part of the air supplied from the blower device is deflected toward the nozzle at a predetermined position in the chamber.

Thus, in the first and second aspects of the present invention, it is preferred that air is blown out uniformly from the opening of the nozzle toward the open portion of the insertion slot, by freely selected methods such as forming the chamber in a wedge shape, providing the air deflection device and the like.

BRIEF DESCRIPTION OF THE DRAWINGS

FIG. 3 is a schematic structural view illustrating a gas outflow preventing device provided in a transport device in the invention.

DESCRIPTION OF THE PREFERRED EMBODIMENTS

Figure 1:
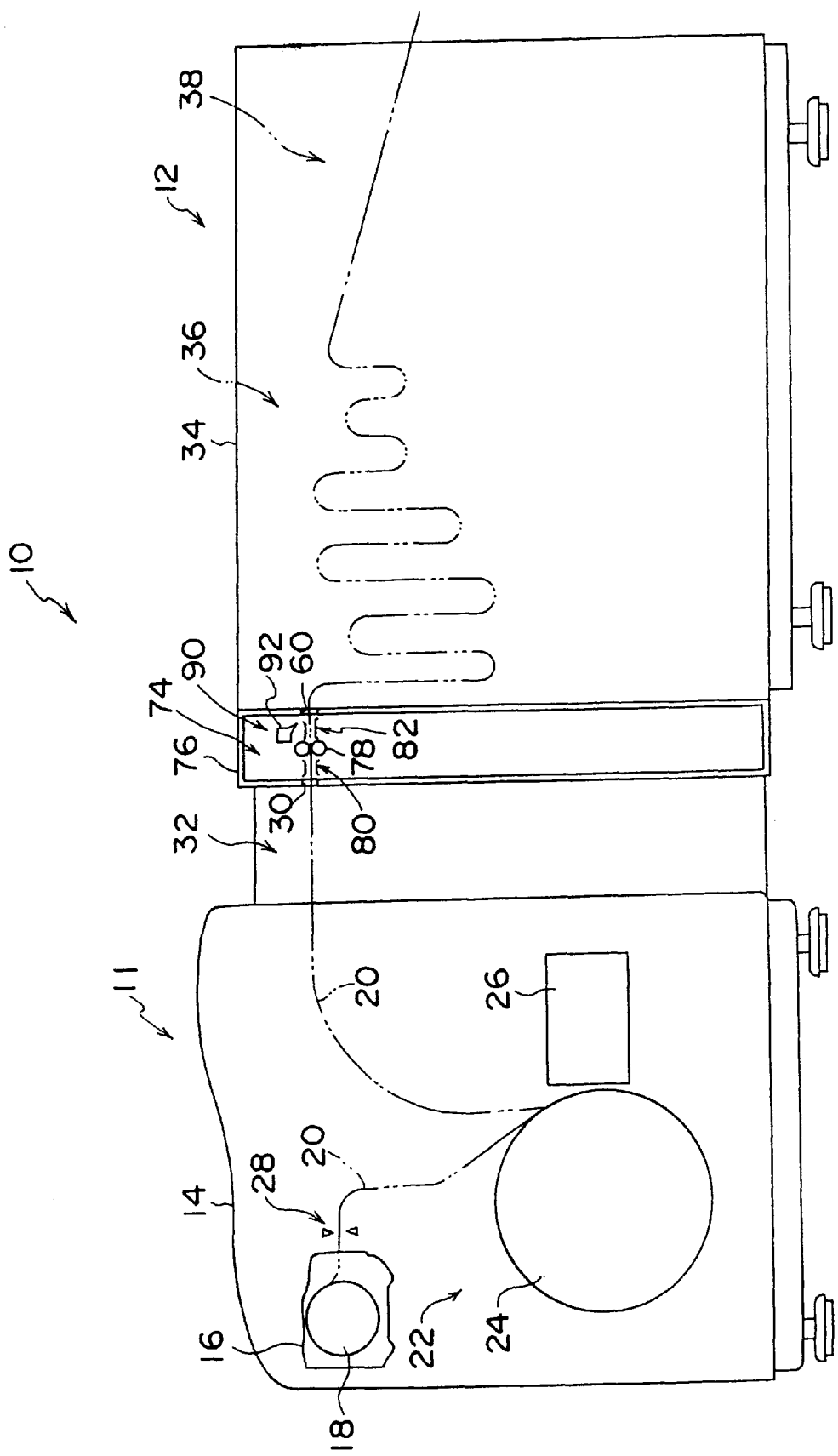
FIG. 1 is a schematic structural view of a color proof producing device relating to an embodiment of the invention.

An embodiment of the present invention will be described in detail with reference to drawings. In FIG. 1, this color proof producing device 10 has a structure in which a transport device 74 as a part of a processor 12 when a photosensitive material processing apparatus is connected to an image exposure device 11.

In the image exposure device 11, a magazine 16 is loaded in a machine casing 14 which shields the inside of the casing from light. In the magazine 16, a roll of photosensitive material 18, which is formed by winding a photosensitive material 20 in the roll form, is accommodated. Also, a recording section 22 which forms an image on the photosensitive material 20 is provided in the image exposure device 11. The recording section 22 includes a rotating drum 24 and a recording head section 26.

In the image exposure device 11, the photosensitive material 20 is pulled out of the magazine 16 and cut to a predetermined length by a cutter 28. The photosensitive material 20 is transported in the sheet form to the recording section 22. Then, the photosensitive material 20 is wound around a peripheral surface of the rotating drum 24 in a predetermined position, in such state that a photosensitive layer of the photosensitive material 20 faces outward. At this time, the photosensitive material 20 is held to the rotating drum 24 by means of a suction mechanism (not shown).

In the recording section 22, when the photosensitive material 20 is wound around the rotating drum 24 and held by suction to the rotating drum 24, the rotating drum 24 is rapidly rotated at a predetermined speed. At the same time, the photosensitive material 20 wound around the rotating drum 24 is irradiated from the recording head section 26 with light beams modulated, synchronously with rotation of the rotating drum 24, in accordance with image data. Thus, the photosensitive material 20 is scan-exposed by the light beams. Further, in the image exposure device 11, by scanning exposure of the photosensitive material 20 on the basis of image data which has been color-separated into red (R), green (G), and blue (B), a color image is formed on the photosensitive material 20.

When scanning exposure on the photosensitive material 20 is completed, the photosensitive material 20 is taken out from the recording section 22 and fed out through an outlet 30 to the direction of the processor 12. Further, in the image exposure device 11, a reversing section 32 is provided in a vicinity of the outlet 30. The photosensitive material 20 is transported before the reverse section 32 so that the photosensitive layer faces downward, and the photosensitive material 20 is inverted in the reversing section 32 such that the photosensitive layer faces upward.

The photosensitive material 20 discharged from the image exposure device 11 is fed into a processing section 36 through the transport device 74 in the processor 12 which serves as a photosensitive material processing apparatus in the present embodiment.

Figure 2:
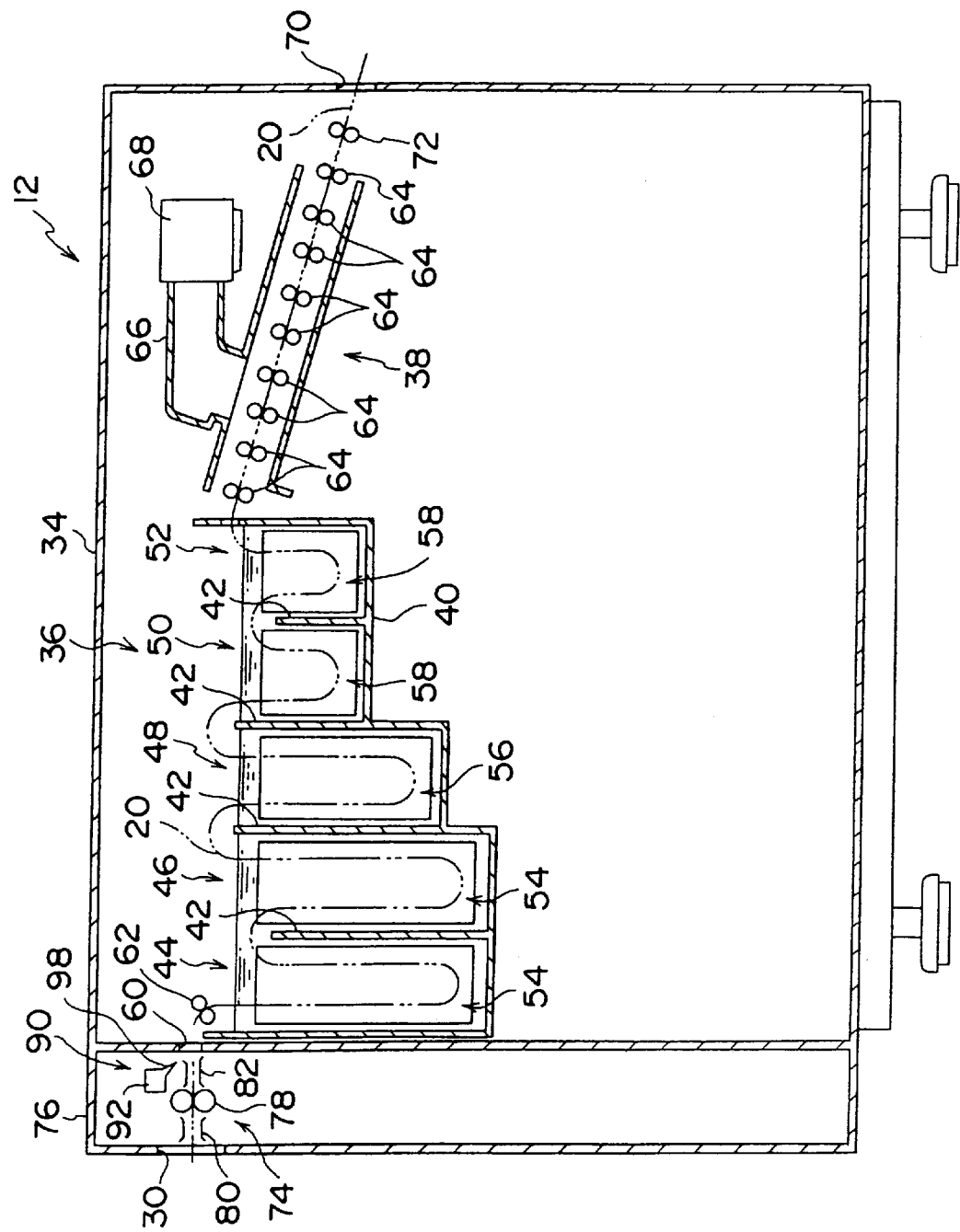
FIG. 2 is a schematic structural view of a processor applied as an automatic processing apparatus in the invention.

In FIG. 2, the processor 12 has a processing section 36 and a drying section 38, which are provided in a machine casing 34. The processing section 36 includes processing tanks 40.

The processing tanks 40 are divided by a plurality of partitions 42 and respectively store predetermined solutions. In the example, developing tanks 44 and 46, which store developing solution, a bleach-fixing tank 48, which stores a bleach-fixing solution, and rinsing tanks 50 and 52, which store a rinsing solution or washing water, are provided along the transport direction of the photosensitive material 20 (from left to right in FIG. 2).

Processing racks 54, 56 and 58, which include rollers and guides (not shown), are provided respectively, in the developing tanks 44 and 46, the bleach-fixing tank 48, and the rinsing tanks 50 and 52. These processing racks 54, 56 and 58 form a transport path which guides and transports the photosensitive material 20 substantially along U-shapes. Further, guides (not shown), which guide the photosensitive material 20 from the upstream processing tank to the downstream processing tank, can be provided over the partitions 42.

An insertion slot 60 is formed in the machine casing 34 of the processor 12 at the coming side of the photosensitive material 20 into the processing section 36. A pair of insertion rollers 62 are disposed inside the insertion slot 60. The photosensitive material 20 fed into the insertion slot 60 is pulled into the machine casing 34 by the pair of insertion rollers 62 and fed into the processing tanks 40 in the processing section 36.

In the processing section 36 of the processor 12, when the photosensitive material 20 is fed into the processing tanks 40, the photosensitive material 20 is guided and transported sequentially through the developing tanks 44 and 46, the bleach-fixing tank 48 and the rinsing tanks 50 and 52 by the processing racks 54, 56, and 58. Thus, the photosensitive material 20 is processed by sequential immersion in the developing solution and the bleach-fixing solution. Then, the photosensitive material 20 is rinsed by immersing it in the rinsing solution to remove the chemicals in the processing solutions such as the bleach-fixing agent from the photosensitive material 20.

Further, the partition 42 between the developing tanks 44 and 46 and the partition 42 between the rinsing tanks 50 and 52 are set lower than surface levels of the developing solution and the rinsing solution, respectively. Thus, the photosensitive material 20 is passed from the developing tank 44 to the developing tank 46 and from the rinsing tank 50 to the rinsing tank 52 in a state of being immersed in the developing solution and the rinsing solution, respectively.

After the photosensitive material 20 is processed with processing solutions and rinsing processing, it is fed into the drying section 38.

In the drying section 38, a straight transport path which guides and transports the photosensitive material 20 is formed with pairs of rollers 64. The photosensitive material 20 fed into the drying section 38 is transported between pairs of rollers 64 in the drying section 38.

In the drying section 38, a duct 66 is provided. One end of the duct 66 is opened toward the transport path of the photosensitive material 20. The other end of the duct 66 is connected to a dry wind generating section 68.

The dry wind generating section 68 includes, for example, a fan and a heater (not shown). Dry wind generated by the fan is heated to a predetermined temperature and fed into the duct 66. The dry wind fed into the duct 66 is blown out toward the photosensitive material 20 transported along the transport path. The photosensitive material 20 that is transported in the drying section 38 is dried by the dry wind.

In the machine casing 34 of the processing section 36 of the processor 12, a discharge outlet 70 is formed. A pair of discharge rollers 72 are disposed in a vicinity of the outlet 70. The photosensitive material 20 dried in the drying section 38 is nipped between a pair of discharge rollers 72 and fed out through the outlet 70 outside of the machine casing 34.

Further, in the processing section 36 of the processor 12, the temperatures of the developing solution in the developing tanks 44 and 46 and the bleach-fixing solution in the bleach-fixing tank 48 are regulated by means of a heater (not shown). Thus, the temperatures of the developing solution and the bleach-fixing solution are maintained at predetermined and optimum ranges for processing of the photosensitive material 20. Therefore, in the machine casing 34, air temperature and humidity in the processing section 36, as well as in the drying section 38, are high. Moreover, chemicals of the developing solution and the bleach-fixing solution are contained in the air in the machine casing 34 of the processor 12.

In FIG. 1, a transport device 74 is provided between the image exposure device 11 and the processing section 36 of the processor 12. A casing 76 of the transport device 74 connects the machine casing 14 of the image exposure device 11 with the machine casing 34 of the processor 12. Thus, the photosensitive material 20 which is fed out from the image exposure device 11 can be transported to the processor 12 in a light-shielded state.

In FIG. 2, in the transport device 74, a pair of transporting rollers 78 are provided in the casing 76. Further, a first guide 80 is disposed between the outlet 30 of the image exposure device 11 and the pair of rollers 78, and a second guide 82 is disposed between the pair of transporting rollers 78 and the insertion slot 60 of the processing section 36 of the processor 12.

The photosensitive material 20 which is discharged from the outlet 30 of the image exposure device 11 is guided to the pair of transporting rollers 78 by the first guide 80 and nipped between the pair of transporting rollers 78. Further, the photosensitive material 20 that was nipped between the pair of transporting rollers 78 is guided to the insertion slot 60 of the processing section 36 of the processor 12 by the second guide 82. The transport device 74 drives the pair of transporting rollers 78 at a predetermined rotating speed, and feeds the photosensitive material 20 into the processing section 36 of the processor 12 at a transport speed of the photosensitive material 20 in the processing section 36 of the processor 12, while pulling out the photosensitive material 20 from the image exposure device 11.

The second guide 82 is formed by an upper second guide 82A and a lower second guide 82B in FIG. 3. The photosensitive material 20 is transported between the upper second guide 82A and the lower second guide 82B toward the insertion slot 60, in such state that the photosensitive layer (emulsion coating layer) of the photosensitive material 20 faces upward.

The insertion slot 60 of the processor 12 is in the slit form to match the transverse length (a length of the direction perpendicular to the transport direction) of the photosensitive material 20. In the insertion slot 60, a third upper part guide 84A and a third lower part guide 84B are provided as a pair. Between the third upper part guide 84A and the third lower part guide 84B, edge guides 86 are disposed. The edge guides 86 are provided in both side edges of the transverse direction of the photosensitive material 20. In other words, the insertion slot 60 is formed substantially in a duct form by the third upper part guide 84A, the third lower part guide 84B, and the edge guides 86 (referred to hereinafter as "insertion duct 88"). The photosensitive material 20 is passed through the insertion duct 88 by the second guide 82 and is fed into the machine casing 34.

A gas outflow preventing device 90, which prevents air in the processing section 36 of the processor 12 from flowing out, is provided in the casing 76 of the transport device 74, as illustrated in FIG. 1 to FIG. 5.

This gas outflow preventing device 90 includes a chamber 92. The chamber 92 has an elongated rectangular cylindrical shape in FIGS. 4 and 5. The chamber 92 is disposed above the second guides 82 such that the longitudinal direction of the chamber 92 is disposed along the transverse direction, which is perpendicular to the transport direction, of the photosensitive material 20. Further, one longitudinal direction end side of the chamber 92 is closed, and the other longitudinal direction end side of the chamber 92 is connected to one end of a duct 94.

The gas outflow preventing device 90 includes a blower fan 96 which serves as a blower device in FIG. 3. The blower fan 96 is connected to the other end of the duct 94. The gas outflow preventing device 90 blows air into the chamber 92 via the duct 94 by operating the blower fan 96.

Figure 4:
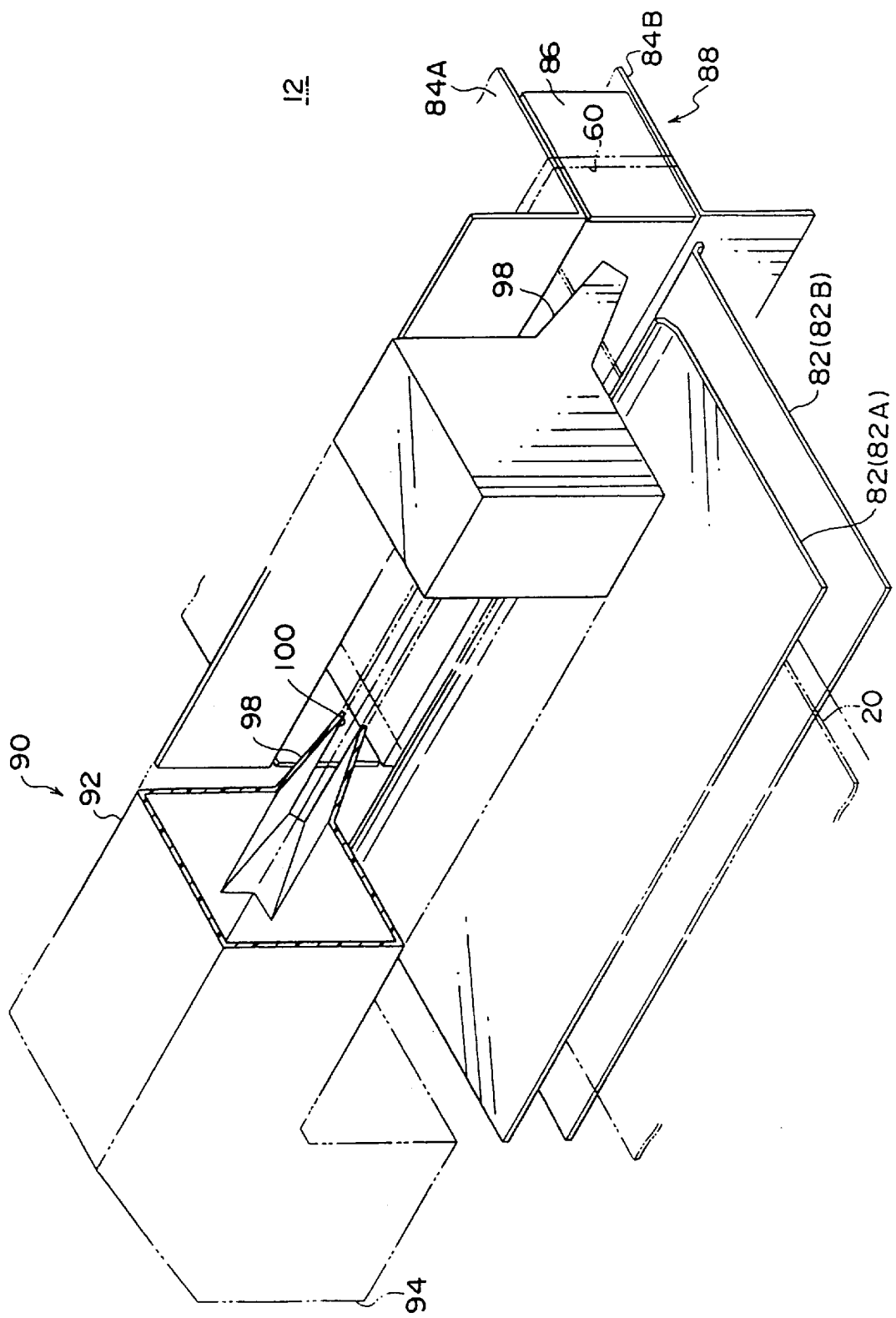
FIG. 4 is a schematic perspective view illustrating a chamber and a nozzle of the gas outflow preventing device which is provided opposing an insertion slot.
Figure 5:
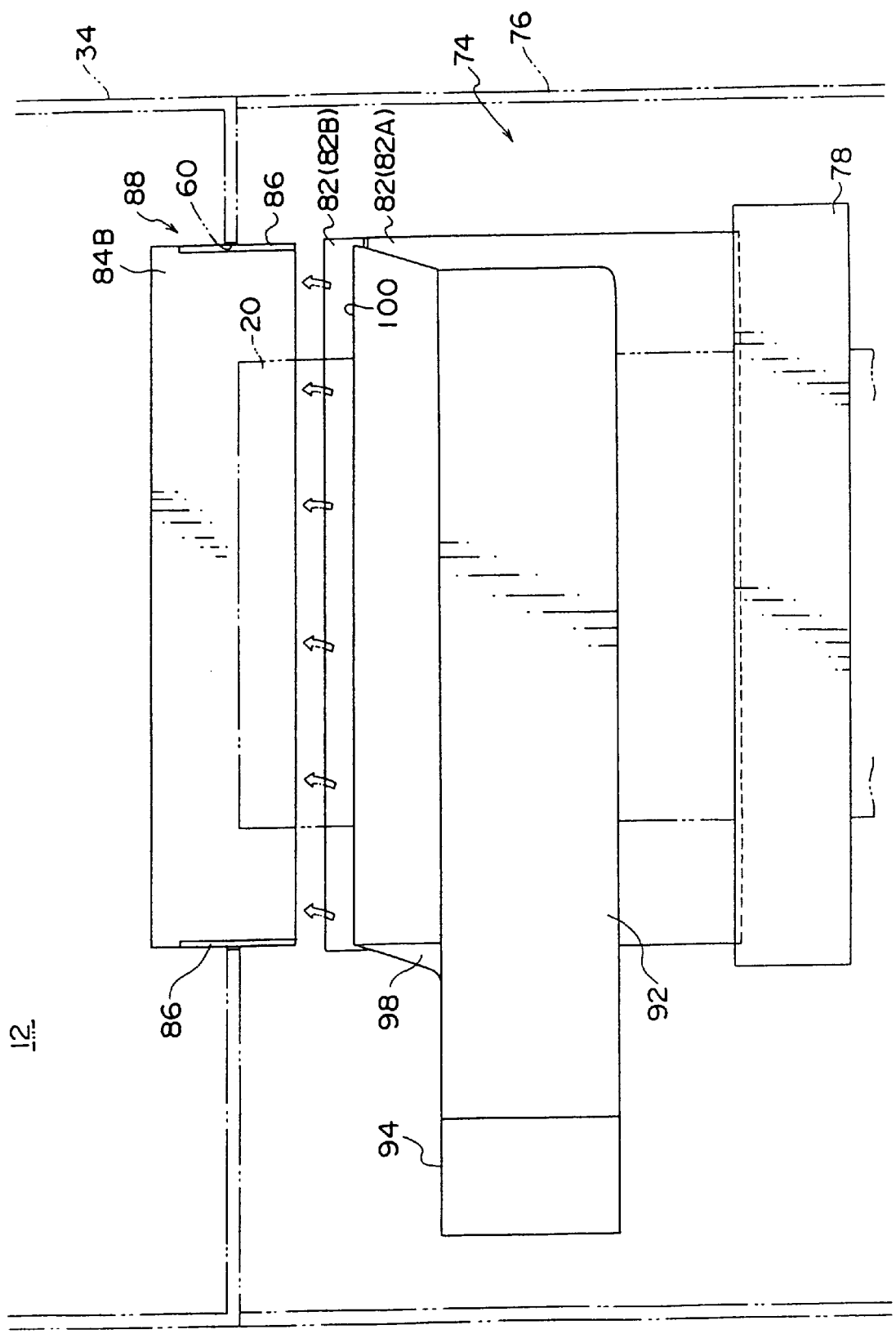
FIG. 5 is a schematic top view illustrating a vicinity of the insertion slot whereat the chamber and the nozzle are provided.

A nozzle 98 protrudes from the chamber 92 toward the insertion slot 60 of the processing section 36 of the processor 12 in FIGS. 3 to 5. The nozzle 98 is provided along the transverse direction of the photosensitive material 20 and is disposed such that it is faced with the entire length of the insertion slot 60 along the transverse direction of the photosensitive material 20 in FIGS. 4 and 5.

The interior of the nozzle 98 is hollow in FIGS. 3 and 4. An ejecting slit 100 is provided at a distal end of the nozzle 98. Further, the cross-section of the nozzle 98 gradually narrows toward the ejecting slit 100.

Thus, air supplied to the chamber 92 by the blower fan 96 flows into the nozzle 98 and is blown out from the ejecting slit 100 toward the insertion slot 60 of the processing section 36. The chamber 92 is formed so as to blow out air substantially uniformly from the ejecting slit 100, which is disposed such that the longitudinal direction thereof is along the longitudinal direction of the insertion slot 60. As the chamber 92, an optional structure can be selected which can blow out a substantially uniform flow rate of air from the entire length of the ejecting slit 100 of the nozzle 98 toward the insertion slot 60, for example, a structure in which a cross-section of the interior of the chamber 92 gradually narrows from the duct 94 side, a structure in which air flow rate control plates 116 is disposed in the chamber 92 in FIG. 6.

In the second guide 82, the upper second guide 82A is shorter than the lower second guide 82B. Thus, the nozzle 98 is prevented from interfering with the second guide 82, and air blown out from the ejecting slit 100 toward the insertion slot 60 is prevented from being intercepted by the second guide 82 (the upper second guide 82A).

When the processor 12 is operated, the gas outflow preventing device 90 operates the blower fan 96 and blows air from the air ejecting slit 100 toward the insertion slot 60 of the processing section 36 of the processor 12. Air blown out from the ejecting slit 100 is blown into the insertion duct 88. Thus, an air curtain which prevents air in the machine casing 34 of the processor 12 from flowing out through the insertion slot 60 is formed in the insertion duct 88. Further, air blown out from the ejecting slit 100, while forming the air curtain in the insertion duct 88, is blown into the machine casing 34 of the processor 12.

Thus, even though pressure in the machine casing 14 of the image exposure device 11 is reduced due to the suction holding of the photosensitive material 20 around the rotating drum 24 by the image exposure device 11, it is prevented that air is flown out from the machine casing 34 of the processor 12 through the insertion slot 60.

The photosensitive material 20 fed out from the image exposure device 11 is inserted into the insertion slot 60 (insertion duct 88) through the transport device 74, wherein the air curtain is formed by the gas outflow preventing device 90, in such state that the photosensitive layer faces upward.

In the embodiment, for example, the maximum length in the transverse direction of the photosensitive material 20 to be processed by the processor 12 is about 635 mm, the opening of the insertion slot 60 (insertion duct 88) has a length in the vertical direction of about 10 mm and a length in the longitudinal direction of about 650 mm (along the transverse direction of the photosensitive material 20), and the gas outflow preventing device 90 blows out at an air flow rate of from 0.01 $m^3$/sec. to 100 $m^3$/sec., preferably from 0.1 $m^3$/sec. to 10 $m^3$/sec. from the ejecting slit 100 toward the insertion slot 60.

Operation of the embodiment will be described below.

When the processor 12 of the color proof production device 10 is in operation and image data for making a color proof is inputted to the image exposure device 11, the image exposure device 11 begins operation.

The photosensitive material 20 pulled out from the magazine 16 and cut to the predetermined length is wound around the rotating drum 24 of the image exposure device 11 such that the photosensitive layer faces outward in the radial direction and the photosensitive material 20 is held by suction. After that, the image exposure device 11 irradiates the photosensitive material 20 with light beams modulated on the basis of the image data while the rotating drum 24 rotates, and thereby imagewise scan-exposes the photosensitive material 20. Thus, an image is formed on the photosensitive material 20 on the basis of the image data.

The exposed photosensitive material 20 is removed from the rotating drum 24, is transported to the reversing section 32 and is fed out through the outlet 30 to the transport device 74. In the reversing section 32, the photosensitive material 20, which was torn away from the rotating drum 24 in such state that the photosensitive layer faces down, is inverted and discharged through the outlet 30 in such state that the photosensitive layer faces upward.

In the transport device 74, the photosensitive material 20 which has been discharged from the image exposure device 11 is transported by the pair of transporting rollers 78 and fed into the insertion slot 60 of the processor 12.

When the processor 12 detects that the photosensitive material 20 has been inserted through the insertion slot 60, for example, by an insertion sensor (not shown), the processor 12 drives transportation rollers such as the pair of insertion rollers 62. Thus, the photosensitive material 20 inserted into the insertion slot 60 is pulled into the processing section 36. The photosensitive material 20 is transported sequentially through the developing tanks 44 and 46, the bleach-fixing tank 48, and the rinsing tanks 50 and 52. Thus, the material 20 is processed with the developing solution, the bleach-fixing solution, and the rinsing solution or water. At this time, because the temperature of the developing solution and the bleach-fixing solution are maintained at the predetermined range, the photosensitive material 20 is rapidly processed under suitable processing conditions.

When processing of the photosensitive material 20 by the processing section 36 of the processor 12 has been completed, the photosensitive material 20 is transported by the pairs of rollers 64 in the drying section 38. While the photosensitive material 20 is being transported, the dry wind generated at the dry wind generating section 68 blows onto the photosensitive material 20 and performs drying processing thereof. The photosensitive material 20 which is dried in the drying section 38 is nipped and transported by the pair of discharge rollers 74, and discharged from the outlet 70 as a color proof.

In the processor 12, because of various factors such as the storage of the processing solutions or the regulation of its temperature, air temperature and humidity in the machine casing 34 are high. Further, the air in the machine casing 34 contains chemicals of the processing solutions. If the air in the machine casing 34 enters the transport device 74 and the image exposure device 11, condensation will occur and components or parts in the transport device 74 and the image exposure device 11 will be corroded.

Also, because the image exposure device 11 which is connected to the processor 12 sucks and holds the photosensitive material 20 on the rotating drum 24 by negative pressure, pressure in the machine casing 14 is reduced, particularly when the photosensitive material 20 is attached to the rotating drum 24. Therefore, air in the machine casing 34 of the processor 12 is easily flown through the casing 76 of the transport device 74 into the machine casing 14 of the image exposure device 11.

In the color proof producing device 10 in which the image exposure device 11 and the processor 12 are connected to each other, the gas outflow preventing device 90 is provided in the casing 76 of the transport device 74 which is connected to the insertion slot 60 of the processing section 36 of the processor 12.

In the gas outflow preventing device 90, air is fed into the chamber 92 by the blower fan 96. In the chamber 92, the nozzle 98, in which the air ejecting slit 100 is formed, is provided so that it faces the insertion slot 60, which is always open such that the photosensitive material 20 can pass therethrough. The air supplied to the chamber 92 by the blower fan 96 is blown out from the ejecting slit 100 of the nozzle 98 toward the opening of the insertion slot 60, and forms an air curtain which blocks air within the machine casing 34 from flowing out through the insertion slot 60. The gas outflow preventing device 90 forms the air curtain such that the air which is blown out from the ejecting slit of the nozzle 98 pushes into the machine casing 34 through the insertion slot 60.

Hence, even though pressure in the machine casing 14 of the image exposure device 11 is reduced, air in the machine casing 34 of the processor 12 does not flow out through the insertion slot 60 and, moreover, does not enter the machine casing 14 of the image exposure device 11.

Thus, even when an imagewise exposed photosensitive material 20 is discharged, while the subsequent photosensitive material 20 is sucked and held onto the rotating drum 24, the highly humid air containing chemicals of the processing solutions in the processor 12 can be prevented from entering the image exposure device 11.

That is, in the color proof producing device 10, imagewise exposure of the photosensitive material 20 is performed efficiently in the image exposure device 11, and a number of color proofs can be produced for a short period.

Further, if scratches is formed on the photosensitive layer of the photosensitive material 20, the finishing quality of the color proofs is degraded, and accurate proofing operations may become impossible.

To overcome the problem, in the gas outflow preventing device 90 of the present invention, the nozzle 98 is provided on the photosensitive layer of the photosensitive material 20. Air is blown on the photosensitive layer of the photosensitive material 20 when the photosensitive material 20 is inserted into the insertion slot 60. Thus, the photosensitive material 20 is transported in such state that the surface opposite to the photosensitive layer is in contact with the third lower part guide 84A. Thus, scratches resulting from contact of the surface on the side of the photosensitive layer with the third upper part guide 84A are not formed.

As described above, according to the color proof producing device 10 employing the embodiment, by providing the gas outflow preventing device 90 in the transport device 74, air in the processor 12 is prevented from entering the image exposure device 11, the photosensitive material 20 is efficiently processed, and color proofs with high quality finish can be produced.

Further, although the air flow rate that the gas outflow preventing device 90 blows from the ejecting slit 100 in the embodiment is from 0.01 m$^3$/sec. to 100 m$^3$/sec., and preferably from 0.1 m$^3$/sec. to 10 m$^3$/sec., the flow rate is not limited thereto. Any flow rate which can prevent air in the machine casing 34 of the processing section 36 of the processor 12 from flowing out through the insertion slot 60 when there is a pressure difference between the interior of the machine casing 34 of the processing section 36 of the processor 12 and the interior of the machine casing 14 of the image exposure device 11 may be applied.

Further, although, in the embodiment, the nozzle 98 is provided with the ejecting slit 100, which opens along the transverse direction of the photosensitive material 20, and is provided at the chamber 92, which is formed as a rectangular cylindrical form, configuration of the chamber and the nozzle is not limited thereto.

Figure 6:
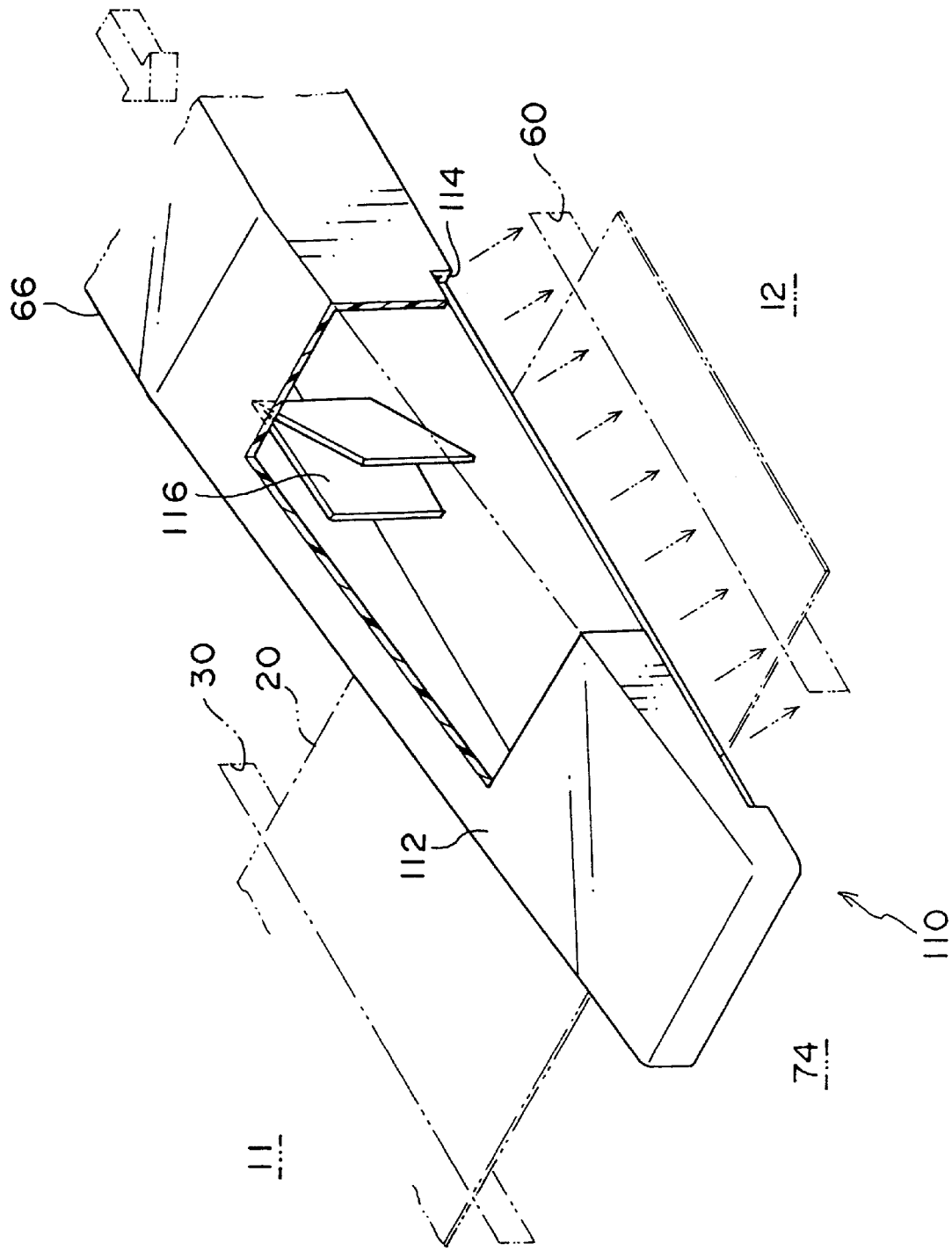
FIG. 6 is a schematic perspective view illustrating another configuration of the nozzle provided opposing the insertion slot.

For example, a nozzle 110 may be used in FIG. 6. In FIG. 6, the structure of the transport device 74 is not shown.

The nozzle 110, is composed of a wedge-shaped chamber 112 and an ejecting slit 114 along the transverse direction of the photosensitive material 20 and facing the insertion slot 60 of the processor 12.

Because the chamber 112 of the nozzle 110 is formed in a wedge shape, the internal cross-sectional area of the chamber 112 gradually narrows from one end side along the transverse direction of the photosensitive material toward the other end side. Thus, the nozzle 110 can blow out substantially uniform amounts of air from the entire length, along the transverse direction of the photosensitive material 20, of the opening of the ejecting slit 114.

Further, flow control plates 116 are provided as an air deflection device in the chamber 112. These flow control plates 116 adjust the flow of a part of the air supplied from one end side of the transverse direction of the photosensitive material 20 toward the transport direction of the photosensitive material 20. Thus, air is blown uniformly along the transport direction of the photosensitive material 20 substantially from the entire length of the ejecting slit 114.

In case that air is blown into the insertion slot 60 diagonally with respect to the transport direction of the photosensitive material 20, there may be an area where air is not blown in a peripheral portion of the opening of the insertion slot 60. Air in the processing section 36 of the processor 12 may flow out through this area. To overcome the problem, the nozzle 110 blows out the flow-adjusted air from the ejecting slit 114 toward the transport direction of the photosensitive material 20 by the flow control plates 116. Thus, there is no area where air is not blown in the periphery of the opening of the insertion slot 60 and air in the processor 12 is reliably prevented from flowing out through the insertion slot 60.

As described above, it is more preferred in the present invention that for the nozzle has a configuration such that air is blown along the transport direction of the photosensitive material 20 substantially uniformly toward the entire opening length of the insertion slot 60 of the processing section 36 of the processor 12.

The embodiment described above is one example of the present invention, and the structure of the present invention is not limited thereto. For example, the embodiment was described as using the color proof producing device 10 in which the image exposure device 11 and the processing section 36 of the processor 12 are connected via the transportation device 74. And, the image exposure device 11 may be for forming a monochrome image on the photosensitive material 20 as well as a color image.

Further, the output device connected to the processor 12 may be an image exposure device having any other structures capable of imagewise exposure on the photosensitive material 20 which is processed by the processor 12, than the image exposure device 11 which holds the photosensitive material 20 by suction with negative pressure. Further, any optional output device capable of feeding out the photosensitive material 20 into the processor 12 can be used as the output device.

Further, the processor 12 is used as the automatic processing apparatus in the embodiment, and any automatic processing apparatus which store processing solutions for photosensitive material, such as a developing solution or a fixing solution, and regulate the temperature of the processing solutions, can be used in the invention.

Further, in the embodiment, the gas outflow preventing device 90 is disposed facing the insertion slot 60 of the processing section 36 of the processor 12 which is connected to the image exposure device 11. However, the gas outflow preventing device 90 may also be disposed facing the insertion slot 60 of the processing section 36 of this processor 12 when the processor 12 is used alone, without connecting the output device. Thus, leakage from the insertion slot 60 of air containing chemicals of the processing solutions and having an odor can be prevented.

What is claimed is:

1. An automatic processing apparatus for processing an imagewise exposed photosensitive material with a processing solution, comprising:

(a) a housing having an insertion slot of the photosensitive material for receiving the exposed photosensitive material therethrough into the housing for processing the photosensitive material with the processing solution;

(b) a conveyor system disposed in the housing, which conveys the photosensitive material along a transport path, while the photosensitive material is processed with the processing solution;
  (c) a gas outflow preventing device for preventing gas outflow from the housing, including:
    (i) a nozzle having an opening disposed toward the transporting direction of the photosensitive material and transversely directed toward the insertion slot; and
    (ii) a blower connected to the nozzle, air is supplied from the blower to the nozzle.

2. The automatic processing apparatus of claim 1, wherein the nozzle is disposed facing a side of the photosensitive layer on the photosensitive material which has coated layers on opposite surfaces of a support.

3. The automatic processing apparatus of claim 1, wherein the insertion slot includes an entrance leading into the housing, the entrance being elongated to direct air into said entrance by the nozzle.

4. The automatic processing apparatus of claim 1, wherein the nozzle is elongated, and has a length extending along the entire slot length, transversely across the transport path.

5. The automatic processing apparatus of claim 4, wherein the gas outflow preventing device includes a chamber connected in air communication between the nozzle and the blower, wherein when the blower operates, air travels from the blower to the chamber and then exits through the nozzle, the nozzle gradually funneling air from a space having a large cross-sectional area in the chamber to a smaller cross-sectional area in the chamber extending transversely across the transport path.

6. The automatic processing apparatus of claim 5, wherein the chamber includes an air deflector disposed therein, the air deflector oriented for deflecting air traveling from the blower, toward the nozzle.

7. An automatic processing apparatus for processing photosensitive material with a processing solution, comprising:
  (a) a conveyor which receives and conveys photosensitive material along a transport path, including a plurality of rollers which rotate as the photosensitive material is conveyed along the transport path;
  (b) a processing section substantially closing a portion of the transport path, including an opening in the form of a slot, which receives an exposed photosensitive material into the processing section, and at least one tank for containing the processing solution in which the photosensitive material is dipped as it is conveyed along at least a portion of the transport path in the processing section; and
  (c) a gas outflow preventing device having an outlet disposed along the slot, and supplying an air curtain flown toward the slot with an air stream, when the air stream is received by the gas outflow preventing device.

8. The automatic processing apparatus of claim 7, wherein the photosensitive material includes a photosensitive layer and a non-photosensitive layer on opposite sides of a support, and said non-photosensitive layer does not face the outlet of the gas outflow preventing device when the photosensitive material is introduced into the slot of the processing section.

9. The automatic processing apparatus of claim 7, wherein the slot includes an entrance leading into the processing section and, wherein the outlet is disposed for directing an air curtain into said entrance.

10. The automatic processing apparatus of claim 7, wherein the slot has a length extending transversely to the transport path, and the outlet is elongated for directing an air current along the entire length of the slot, toward the inside of the processing section.

11. The automatic processing apparatus of claim 10, wherein the gas outflow preventing device includes a wedge-shaped chamber having an entrance for receiving an air stream, and gradually narrowing in a transverse direction of the photosensitive material.

12. The automatic processing apparatus of claim 11, wherein the gas outflow preventing device includes a blower connected to one end of the chamber and wherein the blower produces an air stream of which at least a portion is directed toward the other end of the chamber, when the blower operates.

13. An image recording device comprising:
  (a) an exposure section which receives photosensitive material, the exposure section including an electromagnetic radiation source operable for directing electromagnetic radiation towards the photosensitive material for exposing the photosensitive material;
  (b) a substantially enclosed processing section having an insertion slot, in which exposed photosensitive material from the exposure section is inserted into the processing section, the processing section including at least one tank for containing processing solution for processing the photosensitive material;
  (c) a transporting section provided between the exposure section and the processing section, the transporting section including at least one roller which rotates for receiving photosensitive material from the exposure section and feeding the material into the insertion slot of the processing section; and
  (d) a gas outflow preventing device including:
    (i) a nozzle having an air ejecting slit provided at the transporting section, extending along the insertion slot, and directed toward the insertion slot of the processing section; and
    (ii) a blower connected in air communication to the nozzle and supplying an air stream to the nozzle when operated, which the air ejecting slit of the nozzle directs towards the insertion slot of the processing section.

14. The image recording device of claim 13, wherein the exposure section includes a negative pressure supplying section for holding the photosensitive material by suction.

15. The image recording device of claim 13, wherein photosensitive material includes opposite surfaces, with one surface being a photosensitive layer, with the nozzle being nearer to the photosensitive layer, than the other surface.

16. The image recording device of claim 13, wherein the insertion slot of the processing section has an entrance leading into the processing section, wherein the air ejecting slit of the nozzle is disposed for directing air into said entrance.

17. The image recording device of claim 13, wherein the gas outflow preventing device includes a chamber disposed in air communication between the nozzle and the blower, wherein when the blower operates, air travels from the blower to the chamber and then exits through the nozzle, the nozzle gradually funneling air from a space having a large cross-sectional area in the chamber to a smaller cross-sectional area in the chamber extending transversely across the transport path.

18. The image recording device of claim 17, wherein the chamber includes an air deflector disposed therein, which when an air stream is flowing from the blower into the chamber, the air deflector deflects at least part of the air stream toward the nozzle.

* * * * *